United States Patent
Joshi et al.

(10) Patent No.: US 6,944,796 B2
(45) Date of Patent: Sep. 13, 2005

(54) METHOD AND SYSTEM TO IMPLEMENT A SYSTEM EVENT LOG FOR SYSTEM MANAGEABILITY

(75) Inventors: Aniruddha P. Joshi, Chandler, AZ (US); Peter R. Munguia, Chandler, AZ (US); Jennifer C. Wang, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 499 days.

(21) Appl. No.: 10/180,508

(22) Filed: Jun. 27, 2002

(65) Prior Publication Data

US 2004/0003327 A1 Jan. 1, 2004

(51) Int. Cl.[7] ............................................. G06F 11/00
(52) U.S. Cl. ........................................ 714/43; 714/18
(58) Field of Search ............................ 714/47, 39, 43, 714/48, 56, 18, 17, 20

(56) References Cited

U.S. PATENT DOCUMENTS

| | | | | |
|---|---|---|---|---|
| 5,206,948 A | * | 4/1993 | De Angelis et al. ......... 714/45 |
| 6,012,148 A | * | 1/2000 | Laberge et al. ................ 714/2 |
| 6,108,741 A | * | 8/2000 | MacLaren et al. .......... 710/314 |
| 6,311,296 B1 | * | 10/2001 | Congdon ..................... 714/56 |
| 6,321,286 B1 | * | 11/2001 | Goodrum et al. ........... 710/311 |
| 6,510,532 B1 | * | 1/2003 | Pelly et al. ................... 714/43 |
| 6,601,193 B1 | * | 7/2003 | Liebau ........................ 714/39 |
| 6,760,864 B2 | * | 7/2004 | Wood et al. .................. 714/30 |
| 6,792,563 B1 | * | 9/2004 | DesRosier et al. ........... 714/43 |
| 6,834,360 B2 | * | 12/2004 | Corti et al. .................. 714/39 |
| 6,874,103 B2 | * | 3/2005 | Cepulis ....................... 714/13 |
| 2002/0147945 A1 | * | 10/2002 | Fox et al. ..................... 714/47 |
| 2002/0194548 A1 | * | 12/2002 | Tetreault ...................... 714/43 |
| 2003/0033559 A1 | * | 2/2003 | Williams ..................... 714/39 |

* cited by examiner

*Primary Examiner*—Robert Beausoliel
*Assistant Examiner*—Marc M. Duncan
(74) *Attorney, Agent, or Firm*—Kevin A. Reif

(57) ABSTRACT

Embodiments of the present invention provide a system event log for a computer system. The system event log may comprise a RAM coupled to a system bus. The system event log may be configured to record information in the RAM corresponding to bus transactions on the system bus. The information may be used to de-bug system problems.

18 Claims, 2 Drawing Sheets

METHOD AND SYSTEM TO IMPLEMENT A SYSTEM EVENT LOG FOR SYSTEM MANAGEABILITY

FIELD OF THE INVENTION

The present invention relates to computer systems, and more particularly to a method and system for providing an event log of computer system transactions, to enable identifying and de-bugging system problems.

BACKGROUND OF THE INVENTION

Computers used in a wide variety of applications inevitably incur errors during their operations, for example due to failures of software or hardware components. Such failures may pass unnoticed, until their cumulative effect degrades system performance to such an extent that corrective action must be taken. Often, when corrective action becomes necessary, the underlying causes of failures may be difficult to detect, because they may be related to some past operation or system state which cannot be recovered. Because these underlying causes may not be detectable, it may not be possible to rectify them, and therefore the failures persist.

Known methods for attempting to capture system conditions or identify system components which generate errors have entailed connecting logic analyzers to the computer systems and attempting to decipher data traffic therein. However, this approach adversely affects bus electrical integrity.

Accordingly, a method and system are needed for capturing information that enables de-bugging of system problems, without the drawbacks of the prior art.

DETAILED DESCRIPTION

According to embodiments, the invention may comprise a system event log for recording information that can be used to de-bug problems in a computer system. The system event log may be coupled to a bus that carries bus transactions between components of the computer system. The system event log may comprise logic circuitry configurable to record information corresponding to the bus transactions.

The system event log may be accessed by an external system controller that performs a system management function. The external system controller may access the information in the system event log and perform predetermined operations based on the information, such as executing diagnostics on a failing system component.

Advantageously, embodiments of the invention may be implemented in a host/client setting, wherein the external system controller is a host computer that monitors client computers and performs a system management function for the client computers. The client computers may be, for example, a plurality of servers in a communication network node, and may each include a system event log according to embodiments. To individually monitor and de-bug such a plurality of servers by human intervention would be difficult and impractical. The present invention, accordingly, offers an automated method and system for performing such monitoring and de-bugging.

Figure 1:
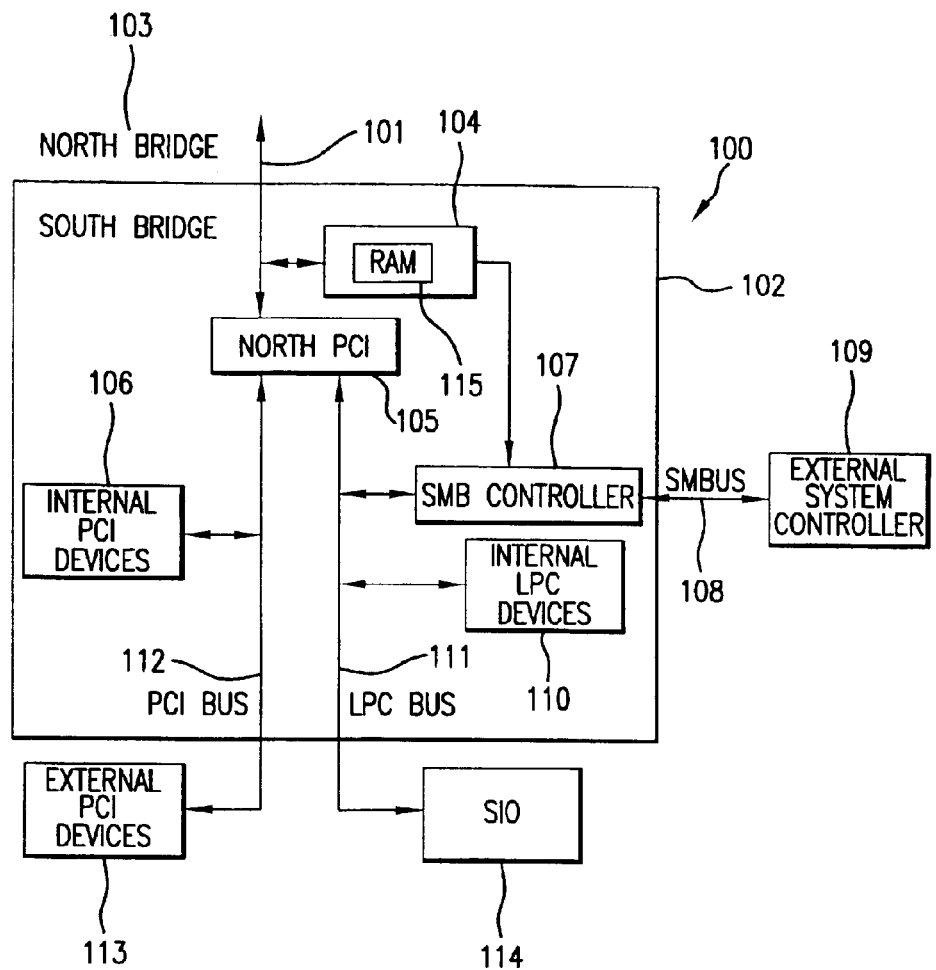
FIG. 1 shows a computer system with a system event log according to one possible embodiment of the invention.

FIG. 1 illustrates one possible hardware platform for implementing embodiments of the invention. FIG. 1 shows a semiconductor device 100 with an Intel ® Hub Architecture. This known architecture comprises an ICH (I/O Control Hub) 102, also referred to as the "South Bridge" or "South Bridge chip"; and a MCH (Memory Control Hub) 103, also referred to as the "North Bridge" or "North Bridge chip." As is known by persons of ordinary skill in the field, generally, the ICH or South Bridge 102 and MCH or North Bridge 103 respectively interconnect ("bridge") various resources of the device 100. Functions of the North Bridge 103 include, for example, acting as a main memory controller and providing an interface between the processor and main memory of the device 100. Functions of the South Bridge 102 include, for example, acting as an interface between main memory and I/O devices via the North Bridge 103.

In FIG. 1, a bus 101 connects the South Bridge 102 to the North Bridge 103. The bus 101, more particularly, may be an address, data and control bus.

According to embodiments of the invention, the South Bridge 103 may include a system event log 104 to record information corresponding to bus transactions occurring on bus 101. The system event log 104 may include a RAM 115 for storing the information. The RAM 115 could be implemented, for example, in a set of general purpose registers or as RAM cells. The system event log 104 may be coupled to the bus 101. Events may be logged in the RAM 115 in a FIFO (First-In, First-Out) manner. The FIFO depth is arbitrary, and typically would be based on system management requirements as determined by a user or designer. For instance, the RAM 115 could be configured to store at least the past 50 bus transactions.

In known devices, the South Bridge does not have a system event log 104 as described in the preceding. Rather, as noted earlier, to perform debugging based on bus activity, North Bridge to South Bridge bus transactions were typically captured by attaching a logic analyzer to the hardware platform containing the North Bridge and South Bridge, which adversely affected bus electrical integrity. In contrast, by providing a system event log 104 according to embodiments, the drawbacks associated with attaching a logic analyzer are avoided, while diagnostic features are enabled that are not supported in known hardware platforms. These diagnostic features are described in more detail in the following, and include, for example, detecting specific information in the bus transactions recorded in the system event log 104, and executing pre-determined diagnostic operations when the specific information is detected.

Additionally, by capturing information corresponding to bus transactions in the system event log 104 according to embodiments of the invention as described above, the concept of bus monitoring, which has been applied successfully in debugging system designs in simulation, is extended into real hardware. Such a feature provides a real-time debugging capability and bus tracking capability in a production system as opposed to a simulated system.

Figure 2:
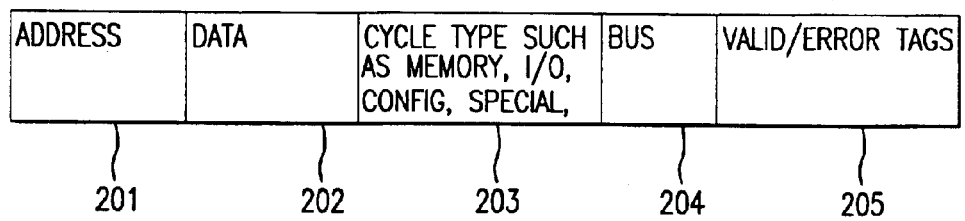
FIG. 2 shows one possible format of an event log record according to an embodiment of the invention.

FIG. 2 shows one possible format for event log records stored in the RAM 104. An event log record 200 could comprise an address field 201, a data field 202, a cycle type field 203, a bus field 204, and a valid/error tag field 205. The information recorded in these fields, as noted earlier, may be derived from bus transactions on the bus 101 connecting the North Bridge and the South Bridge.

The South Bridge 102 may include, and be connected to, various kinds of devices with which transactions may be executed. Such devices include internal peripheral devices such as internal PCI (Peripheral Component Interconnect) devices 106 and internal LPC (Low Pin Count) devices 110, and external peripheral devices such as external PCI devices 113 and SIO (Serial I/O) 114.

The internal PCI devices 106 and external PCI devices 113 may be coupled to a "North PCI" bus controller 105 via a PCI bus 112. The North PCI bus controller 105 may further be coupled to a SMB (System Management Bus) controller 107, discussed in greater detail below, and to internal LPC devices 110 and external SIO 114 via a LPC bus 111.

Operations performed in the North Bridge may call for bus transactions which attempt to access internal or external peripheral devices in or connected to the South Bridge, resulting in bus transactions across the bus 101 between the North Bridge and the South Bridge. When a bus transaction occurs, the system event log 104 may record the address of the internal or external peripheral device that the transaction is attempting to access in the address field 201 of the a system event log record 200. In the data field 202, the system event log 104 may record whether the access is a read or a write, and optionally, the actual data being read or written.

The cycle type of the bus transaction may be recorded in the cycle type field 203 of the system event log record 200. "Cycle" refers to a processing cycle of the computer system; examples include a memory cycle and an I/O cycle.

The bus field 204 may be used to record which bus the transaction is targeted to or originated from. A mapping of peripheral devices to corresponding addresses may assist in identifying which bus the transaction is targeted to or originated from. Some peripheral devices, either internal or external, may use more than one memory or I/O address. These addresses may be contiguous, and denoted by a start address and a range. For example, a start address of 1000H (where "H" indicates hexadecimal notation) and a range of 15 would denote a block of contiguous addresses between 1000H and 100 FH. A mapping of peripheral devices to a block of contiguous addresses may be established at boot time and is typically constant, but may change, for example, if new hardware is added to the system platform. A configuration register may be maintained which contains the mapping of peripheral devices to corresponding addresses, and of the addresses to a corresponding bus. According to one embodiment, the configuration register may be in the North PCI bus controller 105. The system event log 104 may be configured to access the mapping in the configuration register in order to obtain the information needed for the bus field 204 of the event log record 200.

For example, the South Bridge could include, or be connected to, a PCI device "A" which has a memory of 256 bytes. The configuration register could map PCI device "A" to addresses 2000H–20FFH, and further map addresses 2000H–20FFH to the PCI bus 112. Then, when a bus transaction to address 2004H was made, for example, the system event log 104 could access the configuration register to determine that the address of the transaction was in the range used by device "A", and that therefore the targeted bus was the PCI bus 112.

The valid/error tags field 205 may be used to record whether the attempted access to the internal PCI device was successful or unsuccessful. More specifically, the valid tag may specify that a cycle has been terminated without any error, or is still waiting for a response. The error tag may specify that a cycle has an error and the specific type of error, if known (for example, a parity error, a bus error, a timeout, and the like).

The system event log 104 may comprise logic circuitry that is programmable as determined by a user or designer to detect specific information in the bus transactions appearing on the bus 101 and to perform predetermined operations in response. For example, the system event log 104 could be programmed to cause the computer system to halt, for example by generating an interrupt, whenever the system event log 104 detects some predetermined event. Such an event could be, for example, the occurrence of a predetermined type of error, or a bus transaction to a predetermined address. This may be done in order to preserve the system status at the cycle during which the event occurs, and the system status for some predetermined number of cycles preceding the event. Additionally, the system event log 104 could be programmed to cause the computer system to halt after a predetermined number of cycles following a predetermined event, in order to preserve information collected during the predetermined number of cycles following the event. In this way, information relating to system status both preceding and following a predetermined event may be saved and analyzed.

The system event log 104 could further be configured to maintain event statistics. For example, the system event log 104 could be configured to record each occurrence of a predetermined event, such as a particular type of error or access to a particular address, and to generate an interrupt when a predetermined number of the predetermined events occurred.

The system event log 104 could be configured to be enabled or disabled through a global configuration register.

Figure 3:
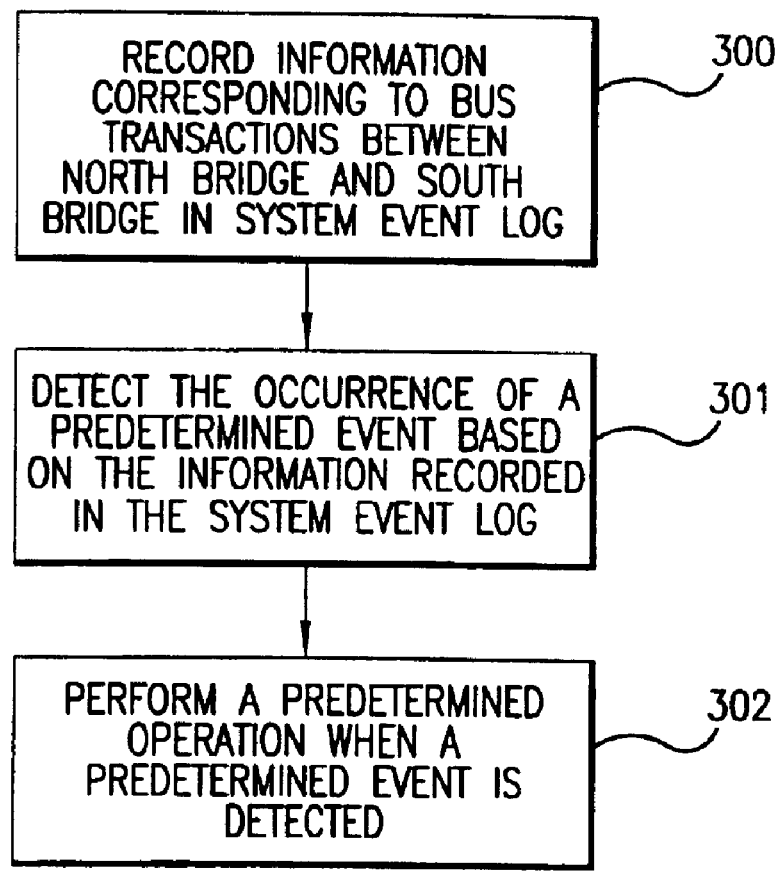
FIG. 3 shows a process flow according to an embodiment of the invention.

FIG. 3 shows a flowchart illustrating a process flow according to embodiments. As shown in block 300, the process may include recording, in the system event log 104, information corresponding to bus transactions propagated on the bus 101 between the North Bridge 103 and South Bridge 102. The information could correspond to an address field 201, a data field 202, a cycle type field 203, a bus field 204, and a valid/error tag field 205 as described above.

As shown in block 301, the process could further include detecting the occurrence of a predetermined event based on the information recorded in the system event log 104. As described above, the predetermined event could include the occurrence of a predetermined type of error, or a bus transaction to a predetermined address.

As shown in block 302, the process could further include performing a predetermined operation when a predetermined event is detected based on the information recorded in the system event log 104. As described above, the predetermined operation could include halting the computer system to preserve system status at the time of the event.

The system event log may be coupled to the SMB controller 107. According to an alternative embodiment not illustrated, the SMB controller 107 could be, for example, a generic serial communication device coupled between the South Bridge 102 and the external system controller 109. Or, for example, the SMB controller 107 could be a component of the South Bridge 102 in an Intel ® chipset as shown in FIG. 1.

As shown in FIG. 1, the SMB controller 107 may be coupled to a system management bus 108 coupled to an external system controller 109. As noted above, the external system controller 109 may be the host, for example, in the host/client model described above. Via the SMB bus 108 and SMB controller 107, the external system controller 109 may access the event log in the RAM 104. The external system controller 109 may, for example, analyze the event log records to determine what kind of corrective action might be needed. Depending upon its determination, the external system controller 109 could, for example, instruct the SMB controller 107 to run diagnostics on a failing device or devices identified in the event log records. The external system controller 109 may access the event log records in response to a certain kind of event, such as an interrupt generated by the system event log 104 which causes the system to halt, or could access the event log records periodically or at arbitrary intervals to check for the occurrence of certain kinds of events.

The system event log 104 could further be configured to notify the external system controller 109 of the occurrence of a predetermined event without necessarily halting the system. The external system controller 109 could then take whatever action might be deemed appropriate, as determined by a user or designer. The external system controller could, for example, access the system event log 104 to collect status information associated with the event, and send an error message to be displayed for a human operator. Or, the external system controller could cause diagnostics associated with the event to be executed.

Advantageously, by providing access to the event log 104 by the external system controller 109 via the external SMB bus 108 and SMB controller 107, the event log 104 may be accessed even when the system is "hung" (i.e., operations have halted due to software or hardware failures, or are proceeding in a severely degraded manner).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer system comprising:
   a north bridge chip and a south bridge chip;
   a bus to carry bus transactions between the north bridge chip and the south bridge chip; and
   a system event log integral with the south bridge chip coupled to said bus to record information corresponding to bus transactions between the North bridge chip and the South bridge chip.

2. The computer system of claim 1, wherein said system event log and configurable to detect specific information in said bus transaction and execute pre-determined operations when said specific information is detected.

3. The computer system of claim 2, wherein said predetermined operations include halting said computer system.

4. The computer system of claim 1, wherein said system event log is couplable to an external system controller that accesses said information and performs pre-determined operations based on said information.

5. The computer system of claim 1, wherein said system event log comprises a FIFO RAM.

6. A method for capturing system performance information in a computer system, comprising:
   providing a chipset comprising a north bridge chip and a south bridge chip;
   providing a bus between the south bridge chip and the north bridge chip;
   providing a system event log integral with the south bridge chip coupled to said bus; and
   recording information corresponding to bus transactions on said bus between the north bridge chip and the south bridge chip in said system event log.

7. The method of claim 6, wherein said information includes whether said bus transaction completed successfully.

8. The method of claim 7, wherein said information further includes an address of a bus transaction to a device of said computer system.

9. The method of claim 6, further comprising:
   detecting the occurrence of a predetermined event based on said information; and
   performing a predetermined operation when said predetermined event is detected.

10. The method of claim 9, wherein said pre-determined operation includes halting said computer system.

11. The method of claim 9, wherein said predetermined event includes a bus transaction to a predetermined address.

12. The method of claim 9, wherein said predetermined event includes the occurrence of a predetermined type of error.

13. A system event log for a computer system, comprising:
   a chipset comprising a north bridge chip and a south bridge chip;
   logic circuitry configurable to record information corresponding to bus transactions on a first bus coupled to said system event log, said first bus connecting the north bridge chip and the south bridge chip; and
   a RAM to store said information integral with said south bridge chip;
   wherein said system event log is accessible via a second bus even when said system is hung.

14. The system event log of claim 13, wherein said logic circuitry is further configurable to detect a predetermined address in a bus transaction, and perform a predetermined operation when said predetermined address is detected.

15. The system event log of claim 14, wherein said predetermined operation includes halting said computer system.

16. A system comprising:
   a north bridge chip;
   a south bridge chip;
   a first bus connecting the north bridge chip and the south bridge chip;
   a memory integral with the south bridge chip connected to the first bus for logging transactions between the north bridge chip and the south bridge chip; and
   a system management bus controller connected to the memory, the system management bus controller to connect to an external system controller via a second bus to analyze logged transactions and halt the system when a predetermined transaction is detected on the first bus.

17. The system as recited in claim 16, wherein the memory comprises a first-in-first-out (FIFO) random access memory (RAM) to store a predetermined number of most recent transactions between the north bridge chip and the south bridge chip.

18. The system as recited in claim 16, wherein the external system controller can analyze the memory even if the system is hung.

* * * * *